Figure 1:
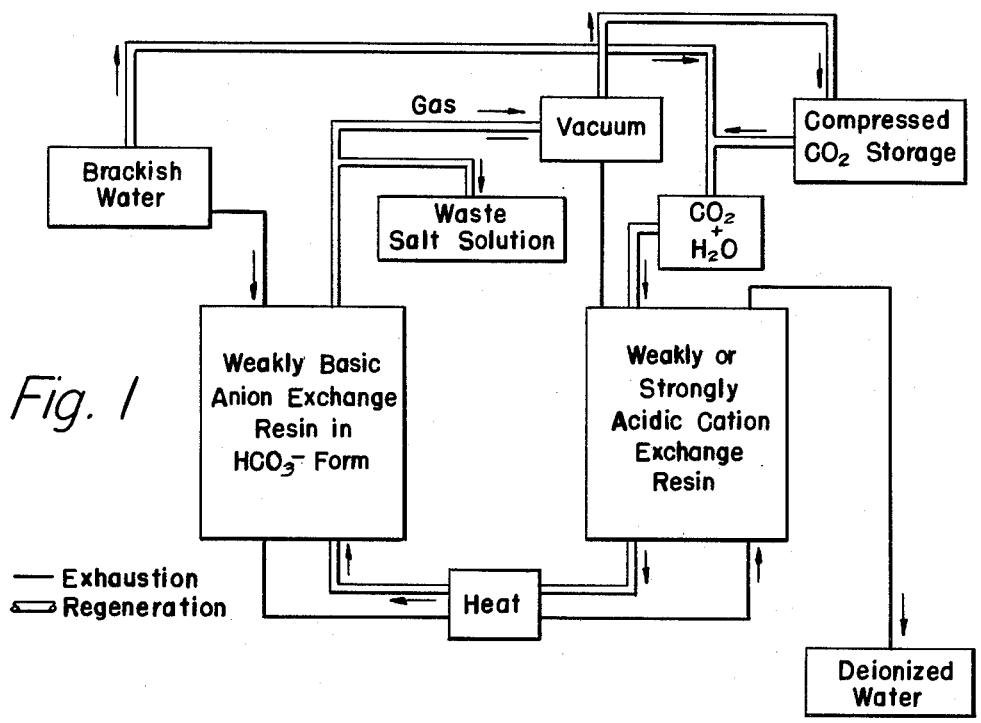

Nov. 10, 1964   R. KUNIN   3,156,644
DEIONIZATION PROCESS
Filed July 25, 1961

— Exhaustion
⇔ Regeneration

United States Patent Office 3,156,644
Patented Nov. 10, 1964

3,156,644
DEIONIZATION PROCESS
Robert Kunin, Yardley, Pa., assignor to Rohm & Haas Company, Philadelphia, Pa., a corporation of Delaware
Filed July 25, 1961, Ser. No. 126,551
20 Claims. (Cl. 210—32)

This invention concerns a process for the deionization of fluids, particularly of aqueous solutions.

More particularly, the invention relates to the removal of ions from fluids by bringing them in contact with separate beds of certain cation exchange and certain anion exchange materials. Even more particularly, the invention involves a two-bed, reverse deionization system based upon a weakly basic anion exchanger in one bed and a weakly or strongly acidic cation exchanger in the other.

Single or separate bed deionization processes of the types described above heretofore have not been very successful. As a result, there were developed deionization processes employing mixtures of weakly basic anion exchangers and weakly acidic cation exchangers, an example being the procedure described in U.S. Patent No. 2,692,244. When such mixed beds have been used, it generally has been necessary to separate the exchangers prior to their regeneration, either by removing the resins from the column in which they are mixed or by stratifying them within the column. More recently, a process has been developed for regenerating the mixed resins without any such separation.

Although these various prior art ion exchange deionization techniques have been increasingly successful, their usefulness has fallen short of their apparent potential with respect to:

(1) Their inability to obtain full utilization of the ion-exchange capacity of the resins at economical regeneration levels;

(2) The changing nature of water supplies; and (3) The physical properties of the resins which limit their optimum performance with respect to current ion-exchange techniques. Thus, although prior art methods for deionizing water by ion exchange are still the major means generally employed, they are being challenged for leadership by such methods as flash evaporation and other thermal distillation procedures for several reasons. One is that many available and desirable water supplies have a considerably increased degree of salinity in comparison with water generally treated in the past, and many prior art mixed bed and multiple bed methods cannot cope with the problem economically when the salt level gets too high.

Since the development of commercially practicable synthetic ion exchange resins over a decade ago, ion exchange techniques have been the preferred methods for treating water because of the high purity they produce. Such treatments have proved entirely practical because the waters which generally have been put through resin columns have had relatively low total dissolved solids (hereinafter identified at "TDS"), but the chemical costs for these systems have been quite high per unit of electrolyte removed. Nowadays, it is becoming more and more necessary to use relatively high TDS waters, and this has contributed even more to the difficulties in getting the standard ion-exchange methods to do an acceptable job as economically as other methods, such as the process using evaporators.

The present invention contributes materially to the advancement of the art of utilizing ion-exchange resins to deionize waters by greatly improving the economics for treating very high TDS water. This is accomplished by a two-bed, reverse deionization system, utilizing an anion exchange column and a cation exchange column. In a preferred embodiment of the system the water is first passed through a bed of a weakly basic anion exchanger and then is passed through a bed of a weakly acidic cation exchanger.

The novelty of the present invention is in the discovery of a technique for forming the bicarbonate form of a weakly basic anion exchange resin, and the further discovery that this form of the resin is highly selective for almost all common anion such as $SO_4^-$, $Cl^-$, etc.

Examples of the weakly basic anion exchange resins which may be employed in this invention are those disclosed in U.S. Patents Nos. 2,354,671; 2,356,151; and 2,402,384 and 2,675,359. Some of the resins may conveniently be prepared by the reaction of phenols with formaldehyde and a polyalkyleneamine. Another type of weak base resin is prepared as described in U.S. 2,591,574 by reacting a halomethylated cross-linked copolymer with a primary or secondary amine.

Examples of the cation exchangers used in this invention are those disclosed in U.S. Patents Nos. 2,319,359; 2,333,754; 2,340,110; and 2,340,111. A particularly preferred cation exchanger is one having carboxylic acid groups in the molecule, prepared by suspension copolymerizing a mixture of methacrylic acid and about 3 to 10% divinylbenzene. This type of resin is commercially available as Amberlite IRC-50 from the Rohm & Haas Company, Philadelphia, Pennsylvania. Numerous other well-known types of carboxylic cation exchangers, such as hydrolyzed styrene maleic anhydride copolymer cross-linked with divinylbenzene, resorcyclic acid formaldehyde, and others of this general nature may be used. Siliceous gel zeolites, as well as the sulfonic and phosphonic resins may be employed, although these cannot be effectively regenerated with $CO_2$.

This invention is illustrated by the accompanying drawings, wherein

Figure 2:
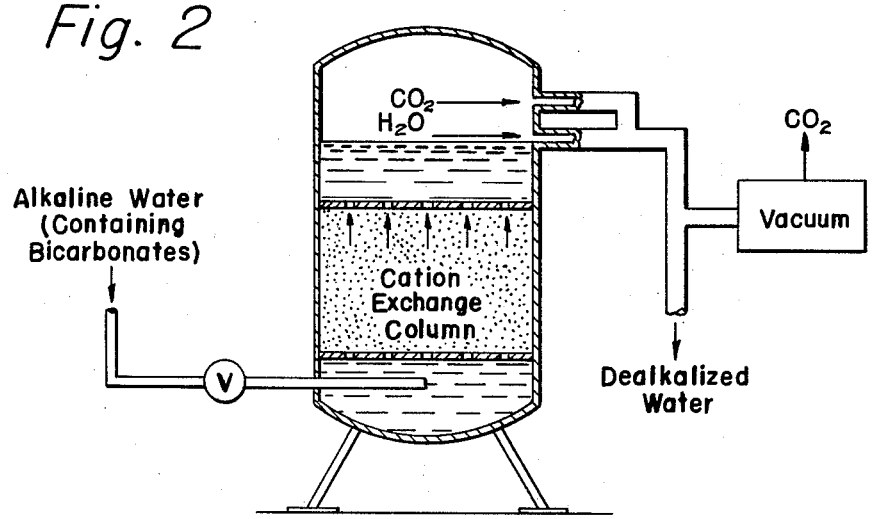

FIG. 1 is a schematic showing of the invention as practiced in a cyclical process; and FIG. 2 is a diagrammatic showing of a novel degasification unit which may be employed in the ion exchange-degasifying stage of the invention.

In lieu of the solid ion exchange-resins described above, it is also possible to use liquid ion exchangers such as are disclosed in U.S. Patents 2,870,207 and 2,955,019. There are a number of such materials commercially available that could be employed. Weakly basic liquid anion exchangers based upon primary, secondary, and tertiary amines are supplied under the trade names Amberlite LA-1, Amberlite LA-2, and Primene JM, by the Rohm and Haas Company, Philadelphia, Pennsylvania. Weakly acidic liquid cation exchangers based upon mono-alkyl acid and dialkyl acid phosphate esters are also known. In general, the preferred liquid ion exchangers which may be used are those derived from a broad class comprising a mixture of amines consisting principally of t-$C_nH_{2n+1}NHX$, where $n$ is a number from 11 to 24 and X is H or an alkyl or an alkenyl group of up to 14 carbon atoms. The amines have a molecular weight of at least about 185.

Among the primary amines which are useful in this invention are compounds having the formulae

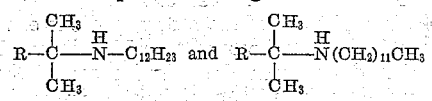

in which R is an alkyl group in the $C_8$ to $C_{11}$ range or a mixture of alkyl groups in which the average carbon content falls within that range. Typical of the secondary amines which could be employed are dodecylbenzyl t-dodecylbenzyl and dodecenyl t-dodecylamine. Typical useful tertiary amines are tridodecyl and dodecylbenzyl-di-n-butyl amines.

Prior to passage through the resins of the raw water to be treated, the anion exchanger, in the free base form, is carbonated with $CO_2$. Thus, when the water is passed through a column of the anion exchanger, the salts in the water are converted by the $HCO_3^-$ ions on the resin to $NaHCO_3$ or bicarbonates of all the cations present. The effluent from this ion exchange treatment is passed through a bed of the cation exchanger, which is in the hydrogen form. The reactions which occur are schematically represented in FIG. 1 of the accompanying drawings and in the following equations in which NaCl is used as a representative salt and R represents any conventional polymeric resin backbone.

I. Preparing the anion exchanger:

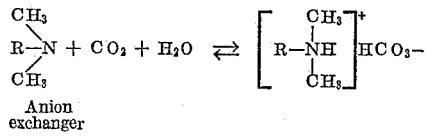

II. Passing saline water through anion exchanger:

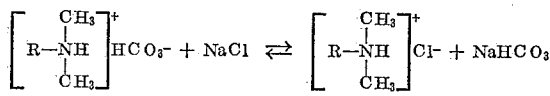

III. Passing effluent from anion exchanger up through cation exchanger:

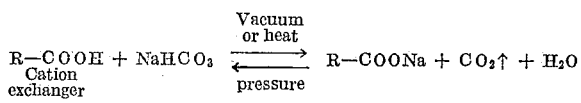

For the purpose of facilitating expulsion of $CO_2$, the effluent from the anion exchange column may be warmed and passed through the cation exchanger at reduced pressure. Unless that gas is expelled, the leakage of bicarbonate may be quite high, particularly in the case of weakly acidic cation exchangers so as to result in poor capacity and, of course, poor deionization. In essence the steps in this cation cycle comprise a combined ion-exchange degasifier operation. Operation of the cation unit so as to effect degasification for removal of $CO_2$ from water is facilitated if done under vacuum, and results in a major improvement in ion exchange capacity. A convenient design of the vacuum equipment is schematically represented in FIG. 2 of the drawing.

The deionization (exhaustion) step functions very effectively, with relatively large capacities at modest flow rates being obtained for each of the resins used. Leakage is quite small so that for a 1000 p.p.m. NaCl feed, resistance of approximately 15 p.p.m. (30,000 ohm-cm.) is readily obtained.

Although reference has been made above to the use of weakly acidic and weakly basic resins in the first stage of the process, it is only economy which has suggested their use. Strongly acidic resins, such as are disclosed in U.S. Patent 2,366,007, for example, certainly are usable in lieu of weakly acidic cation exchangers. Actually, the heart of the invention resides in the weakly basic anion exchanger that is used, although not so much because of the type of resin employed as it does in the use of the bicarbonate form of the resin to convert salts in the fluid being treated to their respective bicarbonates.

In the second stage of the process there is encountered considerable leakage because the $CO_2$ liberated by the reaction interferes with the effectiveness of the action exchange resin. In order to minimize the retarding action of the $CO_2$, the cation exchange unit preferably is operated under vacuum, suction, heat or a combination thereof. The purpose of the heat and the reduced pressure is to reduce the solubility of the $CO_2$ in the aqueous phase. The operation typified by Equation III above preferably is performed upflow as indicated in FIG. 1.

The third stage of the process involves the regeneration of the cation exchange resin after the reaction of Equation III. Several schemes may be used. In the case of weakly acidic cation exchangers, the preferred one involves the use of $CO_2$ under pressure to regenerate the acid resin as follows.

IV. Regeneration of the cation exchanger:

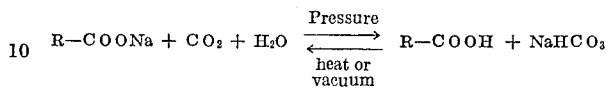

The effluent from this reaction is passed over the anion exchanger under vacuum or heat, as shown in FIG. 1, whereby the following reaction takes place.

V. Regeneration of the anion exchanger:

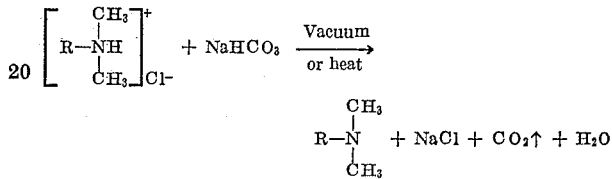

The following examples illustrate the manner in which the present invention operates:

*Example 1*

Twenty-five ml. of a weakly basic anion exchange resin, prepared in accordance with the disclosure in U.S. Patent No. 2,675,359, was placed in a 0.5 inch diameter column and converted to the bicarbonate form by passing 10 volumes of water saturated with $CO_2$ over the resin. A 1000 p.p.m. solution of NaCl was then passed over the resin at a flow rate of 2 gal./cu. ft./min. Thirty bed volumes were collected before any chloride leakage was detected and 40 bed volumes were collected when the leakage was ten percent of the influent.

*Example 2*

The effluent from Example 1 was passed upflow through a bed containing 25 ml. of a weakly acidic carboxylic cation exchange resin in the hydrogen form prepared in accordance with the disclosure in U.S. Patent No. 2,340,110. The passage was helped along by the use of a vacuum of 20 inches of mercury of a flow rate of 2 gal./cu. ft./min. The leakage was less than 5 percent after 30 bed volumes were collected and 10 percent when 40 bed volumes were collected.

*Example 3*

The columns exhausted in Examples 1 and 2 were regenerated by passage of 5 bed volumes of water saturated with $CO_2$ (10 atmospheres) downflow through the bed of the cation exchange resin maintained under pressure (10 atmospheres) and then upflow through the anion exchange resin under a vacuum of 20 inches of mercury. The two columns were then exhausted as described in Examples 2 and 3. Thirty bed volumes of the deionized effluent had an electrical resistance of 60,000 ohm-cm.

*Example 4*

Example 2 was repeated with the following modification: The effluent of Example 1 was heated to 60° C. and the solution passed upflow at atmospheric pressure. The leakage was less than 2 percent after 30 bed volumes and 10 percent after 45 bed volumes.

*Example 5*

Example 3 was repeated with the following modification: The $CO_2$ eluate from the cation exchange column was heated to 60° C. and the solution passed upflow through the anion exchange column at atmospheric pressure. Thirty-five bed volumes of deionized effluent had an electrical resistance of 50,000 ohm-cm.

Example 6

Example 2 was repeated using a 30,000 p.p.m. NaCl (synthetic sea water) solution instead of the 1,000 p.p.m. NaCl solution. Two bed volumes of effluent contained less than 600 p.p.m. NaCl.

Example 7

One hundred ml. of a 10 percent solution in kerosene of a mixture of t-alkyl primary aliphatic amines, principally in the $C_{18}$–$C_{21}$ range, was contacted in a pressurized extraction column with water saturated with $CO_2$ at 15 atmospheres' pressure. The liquid anion exchanger was then contacted countercurrently with a 500 p.p.m. NaCl solution in the extraction column at a pressure of 15 atmospheres.

Example 8

Example 7 was repeated using a different amine, namely

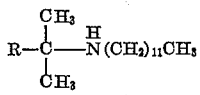

in which R is $C_8$ to $C_{11}$. Six hundred ml. of solution was collected before any noticeable leakage of chloride was detected.

Example 9

The effluent of Example 7 was then contacted countercurrently with 400 ml. of a 10 percent solution of t-dodecyl salicylic acid in benzene. Five hundred ml. of water was collected before any noticeable leakage of electrolyte was detected.

Example 10

Example 9 was repeated with stearic acid in place of t-dodecyl salicylic acid with almost identical results.

While the foregoing examples illustrate the invention as applied to a simple aqueous solution of common salt, it is equally applicable to ionizable materials such as the salts of the alkali, alkaline earth, and heavy metals with the mineral acids, such as the halogen acids, sulfuric, phosphoric, and organic acids such as formic, acetic, oxalic, succinic, malic, and citric. It is also applicable to the separation of salts of organic cations such as amine and quaternary ammonium ions such as the methylamines and betaines.

Similarly, the invention is not limited to deionization of water alone, but may also be applied to the purification of solution of organic materials containing polar impurities. The following example illustrates its application for the removal of salts from sugar solutions in which it is particularly applicable because of the objection to acidic conditions during sugar-refining.

Example 11

The process of Example 2 was repeated with the following modifications: Sugar beet diffusion juice at 50° C. was substituted for the 1,000 p.p.m. NaCl solution. Ten bed volumes of the heated juice (purity 86% and concentration 15 Brix) was passed through the columns as described in Example 2 and the effluent was composited and analyzed. The purity of the treated juice was 95% and only 10% of the original color was present.

I claim:

1. A process for the removal of ionizable matter from fluids which comprises passage of the fluids through a bed of a weakly basic anion exchanger, which has been converted to the bicarbonate form by carbonation with $CO_2$, so as to convert any salt of a highly ionized acid to its corresponding bicarbonate, passing the effluent from said weakly basic anion exchange bed through an acidic cation exchanger in the hydrogen form to remove the cations and to liberate and expel carbon dioxide therefrom, and drawing off the thus degasified effluent as the deionized fluid.

2. The process of claim 1 in which the cation exchanger is strongly acidic.

3. The process of claim 1 in which the cation exchanger is weakly acidic.

4. The process of claim 1 in which the anion exchanger is the bicarbonate form of a liquid selected from the class consisting of primary, secondary and tertiary amines.

5. The process of claim 4 in which the liquid anion exchanger is the bicarbonate form of a mixture of amines consisting principally of t—$C_nH_{2n+1}NHX$, where $n$ is a number from 11 to 24 and X is a member of the class consisting of H, and alkyl and alkenyl groups whose carbon content ranges from $C_1$ to $C_{14}$ and whose molecular weight is at least about 185.

6. A cyclical process for the removal of ionizable matter from fluids which comprises passage of an aqueous carbon dioxide solution over a bed of weakly basic anion exchanger in the free base form so as to convert the exchanger to the bicarbonate form, passage of the fluids to be deionized through the anion exchange bed so as to convert any salt of a highly ionized acid to its corresponding bicarbonate, passing the effluent from said weakly basic bed through a bed of an acidic cation exchanger in the hydrogen form to remove the cations and liberating and expelling carbon dioxide therefrom, drawing off the thus degasified effluent as the deionized fluid, regenerating the cation exchanger by passing an aqueous carbon dioxide solution through the cation exchange bed so as to restore it to its hydrogen form by removing the cations which have become adherent thereto, and regenerating the anion exchanger by passing the effluent from the cation exchanger regeneration step through the anion exchange bed so as to remove the salts which have become adherent thereto and restore it to its bicarbonate form, any excess carbon dioxide passing out of the anion exchange bed being used further for regenerating the cation exchange bed.

7. The process of claim 6 in which the cation exchanger is strongly acid.

8. The process of claim 6 in which the cation exchanger is weakly acid.

9. The process of claim 6 in which the anion exchanger is the bicarbonate form of a liquid selected from the class consisting of primary, secondary and tertiary amines.

10. The process of claim 9 in which the liquid anion exchanger is the bicarbonate form of a mixture of amines consisting principally of t—$C_nH_{2n+1}NHX$, where $n$ is a number from 11 to 24 and X is a member of the class consisting of H, and alkyl and alkenyl groups whose carbon content ranges from $C_1$ to $C_{14}$ and whose molecular weight is at least about 185.

11. The process of claim 1 in which vacuum suction is employed to assist in the expulsion of the carbon dioxide being passed through the cation exchanger.

12. The process of claim 6 in which vacuum suction is employed to assist in the expulsion of the carbon dioxide being passed through the cation exchanger.

13. The process of claim 1 in which the fluid being treated is a sugar solution and the ionizable matter being removed are color bodies.

14. The process of claim 6 in which the fluid being treated is a sugar solution and the ionizable matter being removed are color bodies.

15. The process of claim 1 in which the effluent from the anion exchanger is heated to assist in the expulsion of the carbon dioxide being passed through the cation exchanger.

16. The process of claim 6 in which the respective effluents from the anion exchange bed and from the cation exchange bed are both heated to assist in the expulsion of the carbon dioxide from the respective beds.

17. A process for manufacturing bicarbonates incident to the removal of anions from fluids, said process comprising passage of the fluids through a bed of a weakly basic anion exchanger, which has been converted to the bicarbonate form by carbonation with $CO_2$, whereby to convert any salt of a highly ionized acid in the fluids to the corresponding bicarbonate.

18. The process of claim 17 in which the anion is $Cl^-$.
19. The process of claim 17 in which the anion is $SO_4^=$.
20. In a process whereby there is produced bicarbonates and there is simultaneously eliminated from a fluid anions other than bicarbonate, the step of converting any salt of a highly ionized acid in the fluid to the corresponding bicarbonate by passing the fluid through a bed of a weakly basic anion exchanger, which has been converted to the bicarbonate form by carbonation with $CO_2$.

References Cited in the file of this patent

UNITED STATES PATENTS

| | | |
|---|---|---|
| 2,227,520 | Tiger | Jan. 7, 1941 |
| 2,855,363 | Kittredge | Oct. 7, 1958 |
| 2,989,370 | Lee et al. | June 20, 1961 |

OTHER REFERENCES

"Text" Ion Exchange Resins by Kunin and Meyers, copyright 1950 by Wiley and Sons, Inc.

Nachod: "Ion Exchange, Theory and Application" (1949), Academic Press Inc., Publishers, New York, N.Y., pages 319–320.